United States Patent [19]
Makihara

[11] 3,829,738
[45] Aug. 13, 1974

[54] MICA CAPACITOR
[75] Inventor: Masuichi Makihara, Tokyo, Japan
[73] Assignee: Shinnittoku Denki Kabushiki Kaisha, Tokyo, Japan
[22] Filed: Sept. 5, 1973
[21] Appl. No.: 394,588

[30] Foreign Application Priority Data
  Apr. 16, 1973  Japan ........................... 48-44620

[52] U.S. Cl. .................................. 317/261, 317/258
[51] Int. Cl. ............................................. H01g 1/14
[58] Field of Search ........................... 317/258, 261

[56] References Cited
UNITED STATES PATENTS
| | | | |
|---|---|---|---|
| 2,143,369 | 1/1939 | Dublier | 317/261 |
| 3,229,173 | 1/1966 | McHugh | 317/258 |
| 3,564,360 | 2/1971 | Zimmerman | 317/261 |
| 3,564,361 | 2/1971 | Greenberg | 317/261 |

FOREIGN PATENTS OR APPLICATIONS
| | | | |
|---|---|---|---|
| 1,000,032 | 8/1965 | Great Britain | 317/261 |
| 351,809 | 8/1937 | Italy | 317/261 |

Primary Examiner—E. A. Goldberg
Attorney, Agent, or Firm—Markva & Smith

[57] ABSTRACT

A mica capacitor having lead conductors having a strip-like end portion wound on the mica capacitor at each end thereof through a lead-out foil. With this construction, the thickness of the capacitor can be reduced without reducing the strength of attachment of the leads. Also, it is possible to reduce the manufacturing steps and eliminate failure of soldering.

1 Claim, 1 Drawing Figure

PATENTED AUG 13 1974
3,829,738
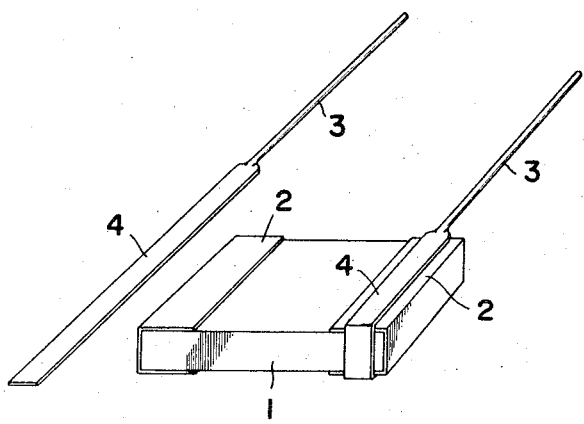

MICA CAPACITOR

This invention relates to improvements in mica capacitors.

In the mica capacitor for household apparatus, lead conductors are attached to the capacitor body either by directly soldering the conductors to the silver surface provided on the mica or by corking the conductors to a lead foil bonded to the silver surface. In these structures, the strength of adhesion of the silver layer to the mica surface constitutes the strength of attachment of conductors.

In mica capacitors for communication and industrial apparatus, increased strength of attachment of lead conductors is provided by corking each conductor to a central portion of a U-shaped metal member termed lug plate and having outwardly extending two lugs or doors formed in the central portion of the plate by cutting it, overlaying the metal member over a U-shaped lead-out foil covering each end of the capacitor body with the top of the foil directed outwardly, bending the opposite ends of the metal plate for pressure fitting it on the end of the capacitor body and welding it to the lead-out foil.

This construction, however, requires the process of forming cuts in the metal plate and the step of corking the lead conductor. Besides, since the portion where the conductor is corked to the cut portion of the metal plate projects, the thickness of the capacitor is increased that much, and the increase of the volume constitutes problems where a number of capacitors are used.

An object of the invention is to provide a mica capacitor, which permits to simplify the lead attachment process compared to the prior art, reduce the manufacturing cost compared to the prior-art mica capacitor and reduce the thickness without reducing the strength of attachment of the lead.

The accompanying DRAWING shows the structure of lead attachment portion of an embodiment of the mica capacitor according to the invention.

Referring now to the drawing, numeral 1 designates a capacitor body, numeral 2 a U-shaped lead-out foil of such metal as lead exposed at each end of the body and connected to an inner silver film electrode, and numeral 3 a lead wire having a rolled strip-like end portion 4.

The end portion 4 of the lead wire 3 is overlaid over the associated lead-out foil 2 and is wound on the body 1 in the manner as shown on the right hand side of the drawing. Thereafter, the system was immersed a melted solder bath to weld the lead-out foil 2 and the end portion 4 to each other.

The capacitor body 1 is obtained by thermally pressing a stack of a plurality of elements each having a silver layer fixed to the opposite sides of a thin mica plate or a single layer element with a mask mica or so-called backing mica applied to each side of the element and with lead-out foils taken out from the silver film of the element to the outside of the backing mica. Thus, portions other than the outer lead-out foils 2 are constituted by mica, so that lead conductors can be readily soldered by the prior-art method of soldering by immersion.

According to the invention, the thickness of the capacitor can be reduced compared to the prior-art capacitor without reducing the strength of attachment of the leads, and also the manufacturing cost can be reduced since the number of manufacturing steps are reduced. Further, in the prior-art capacitor contact resistance is likely to result due to failure of soldering since the lead conductor is corked to the metal plate, but this will never result with the structure according to the invention.

What is claimed is:

1. A mica capacitor comprising:
    a. a longitudinally extending capacitor body having spaced top and bottom surfaces extending between opposite ends thereof,
    b. a pair of substantially U-shaped lead-out foils at opposite ends of said capacitor body, each foil having an intermediate portion extending about one end of said body with the spaced legs thereof covering the adjacent end portions of said top and bottom surfaces,
    c. a pair of lead conductors, each having a strip-like end portion longitudinally extending in a direction transverse to the longitudinal axis of said capacitor body about said body adjacent one end thereof, said strip-like end portion of each lead conductor overlaying the spaced legs of the respective U-shaped lead-out foil on said top and bottom surfaces of said body, and
    d. solder securing together the strip-like end portions of said lead conductors, said U-shaped lead-out foils and said capacitor body,
    e. whereby said leads are securely attached and electrical resistance between said leads and capacitor body is avoided.

* * * * *